United States Patent [19]

Hayasaki et al.

[11] 4,450,014

[45] May 22, 1984

[54] METHOD OF CONTROLLING AN OPERATION OF A COPY-CUTTING APPARATUS

[75] Inventors: Hidehiko Hayasaki, Ohmiya; Motoaki Yasumura, Kawagoe, both of Japan

[73] Assignee: Kabushiki Kaisha Tanaka Seisakusho, Tokyo, Japan

[21] Appl. No.: 515,736

[22] Filed: Jul. 21, 1983

[30] Foreign Application Priority Data

Jul. 23, 1982 [JP] Japan ............................ 57-128426

[51] Int. Cl.³ ..................... B23K 7/02; B23K 7/10
[52] U.S. Cl. ...................... 148/9 R; 266/58; 266/59; 266/60; 318/568; 318/577; 318/578
[58] Field of Search ............... 266/58, 59, 60; 148/9; 318/568, 577, 578, 568

[56] References Cited

U.S. PATENT DOCUMENTS

| | | | |
|---|---|---|---|
| 3,423,081 | 1/1969 | Schwartz | 266/60 |
| 3,515,963 | 6/1970 | Moss | 266/60 |
| 3,772,949 | 11/1973 | Pavone et al. | 266/60 |
| 3,774,098 | 11/1973 | Moss | 266/60 |
| 4,012,027 | 3/1977 | Hooper | 266/60 |
| 4,328,050 | 5/1982 | Ashizawa et al. | 148/9 R |

Primary Examiner—W. Stallard
Attorney, Agent, or Firm—Sughrue, Mion, Zinn, Macpeak & Seas

[57] ABSTRACT

A method of controlling the operation of a copying apparatus which includes a tracer for tracing automatically a contour of a pattern to be copied and a working machine arranged in conjunction with the tracer in a given relationship is disclosed. At first, the tracer is moved manually with respect to the pattern to be traced to detect point data such as a working start point, a copy start point and a copy end point, and then automatically moved along the contour of the pattern to detect pattern data, while the working operation is performed. Next, the thus detected point and pattern data are stored in a cassette tape. Therefore, in case of performing the repetitive working operation for the same pattern, since the working operation can be performed in accordance with the data read out of the cassette tape, the required working operation can be effected in a simple and rapid manner.

25 Claims, 7 Drawing Figures

METHOD OF CONTROLLING AN OPERATION OF A COPY-CUTTING APPARATUS

BACKGROUND OF THE INVENTION

The present invention relates generally to a copying apparatus comprising a tracer for tracing automatically a contour of a pattern to be traced and a working machine having a working head movable in conjunction with the tracer with a given relationship for effecting a given working operation for an object. More particularly, the present invention relates to a method for controlling an operation of the copying apparatus and an apparatus for carrying out the method.

As an example of such a copying apparatus a copy-gas cutting apparatus has been known, which comprises a tracer for tracing automatically a contour of a pattern described on a template and a gas torch assembly having at least one blowpipe for jetting a cutting oxygen flow against an object such as a steel plate. In operation the steel plate is cut by the oxygen flow from the torch, while the tracer follows the pattern on the template in a mechanically contacting or photoelectrically non-contacting manner. In this manner an article or workpiece having the same shape as the pattern of template can be automatically cut out of the steel plate.

In the case of working the object, i.e. the steel plate with such a copy gas-cutting apparatus, the tracer is at first positioned manually at a point which is slightly remote from the pattern on the template and the gas torch assembly is operated to form a hole in the steel plate. This operation is sometimes referred to as piercing. Then the tracer is manually moved from the piercing point to a copy start point on the pattern, while the oxygen gas flow is ejected from the torch, i.e. the cutting operation is continued. After that the tracer traces automatically the pattern on the template and the steel plate is cut accordingly. When the tracer reaches a tracing end point, the ejection of cutting oxygen flow is stopped and then the tracer is removed from the template. In the known copying apparatus an operator must stay always besides the apparatus to control manually the movement of the tracer and the operation of the gas torch. Therefore the known operation is very cumbersome and working efficiency is very low. Particularly in case of effecting a series of operations with using a single template, the operator has to move the tracer to a piercing point each time the single operation has finished. Such operation is much more cumbersome.

In order to obviate the above mentioned drawback there has been devised a copying apparatus in which a tracer moves automatically from a piercing point to a copy start point on a pattern and from a copy end point on the pattern to a next piercing point for a next pattern along guide lines described on the template. In this case it is necessary to prepare special templates on which guide lines have been previously described and thus ordinary templates which have been used heretofore could not be utilized. Since the template requires a very high accuracy the upmost care should be taken in manufacturing the same. Therefore its manufacturing process is quite complicated and results in high cost. Further in actual operation it is sometimes undesirable to predetermine the piercing points, start points and end points in accordance with the shape and material of objects to be worked, shape of pattern, arrangement of patterns in case of using a plurality of patterns. In such a case the template having the guide lines previously described thereon could not be used and the operator must move the tracer manually or a new template having a new guide line described thereon has to be prepared. In either cases the working efficiency becomes lower to a great extent.

Further there has been developed a so-called numerical control system in which position of the working machine with respect to the object are previously set as numerical values which are then stored in a memory as a given program. The movement and operation of the working machine are controlled in accordance with the numerical data read out of the memory. It is apparent that such a numerical control system is very complicated in construction and expensive. Moreover the operation of the machine is exclusively controlled in accordance with the previously determined program and thus could not be easily changed upon the actual working and lacks flexibility. In other words the piercing points, start and end points of copying, etc. could not be simply changed in accordance with the shape and material of object, the shape of the pattern and arrangement of patterns. In practice, the numerical control system is quite inconvenient for effecting particular operations.

Upon operating the known copying apparatus the operator has to control or command the operation of the working machine as well as the movement of the working machine into given positions. For instance, in the copy gas-cutting machine after the tracer has been moved into a piercing point the gas torch is rendered operative to produce a jet of cutting oxygen flow by operating a suitable member on a control panel. When the tracer has reached a copy end point, the oxygen flow is stopped and the tracer is moved into a next piercing point. Then the cutting oxygen gas flow is again jetted from the gas torch. The above mentioned operation is rather cumbersome and results in a decrease in operation efficiency. In the numerical control system these operational functions of the working machine can be previously stored in a memory, and during the working, the operational function of working machine can be controlled by reading the command signals out of the store. However as described above, the numerical control system is very complicated and expensive and lacks the flexibility.

In U.S. Pat. No 4,328,050, there has been proposed a method of controlling a copying apparatus, in which prior to an actual working operation, a tracer is manually moved with respect to a pattern to detects coordinates of the tracer at piercing points, copy start points, copy end points, etc. and the coordinates thus detected are stored in a memory, and during the actual working operation, the movement of a working head out of the pattern is controlled by the stored coordinates and the movement of the working head on the pattern is controlled by the movement of the tracer following the pattern. By means of such a control method, use may be made of ordinary templates without guide line and further various operational points such as piercing points and copy start and end points can be freely determined at the actual working and thus the large versatility and flexibility can be obtained. However, in this control method, every time the template is changed, coordinates of operational points must be stored in a memory and therefore, the total efficiency of the copying machine could not be sufficiently high.

SUMMARY OF THE INVENTION

The present invention has for its object to provide a method of controlling a movement of a tracer of a copying apparatus, in which, when the tracer has once traced a given path on a template, the same operation can be performed repeatedly without tracing the same template again.

It is still another object of the invention to provide a method of controlling a movement of a tracer of a copying apparatus, which can be carried out into effect in a simple and economical manner.

It is still another object of the invention to provide a method of controlling a movement of a tracer of a copying apparatus, in which operational points such as piercing points and copy start and end points can be preset prior to an actual working operation in a very simple manner in accordance with shape and material of objects, shape and arrangement of patterns to be traced.

It is still another object of the invention to provide a method of controlling a movement and operation of a copying apparatus, in which operational functions of a working machine at respective operational points can be automatically controlled by means of a simple and inexpensive manner.

According to the invention, a method of controlling the operation of a copying apparatus which includes a tracer for tracing automatically a contour of a pattern to be copied and a working machine having a working head movable in conjunction with the tracer in a given relationship for effecting a given working operation for an object to be worked comprises the steps of:

(a) prior to an actual working operation, moving the tracer manually with respect to the pattern to be traced to detect point data representing coordinates of the tracer at respective operational points which include at least a working start point, a copy start point, and a copy end point;

(b) storing the point data thus detected in memory means;

(c) moving automatically the tracer by reading the stored point data from the memory means until the tracer reaches the copy start point, and when the tracer has reached the copy start point, the tracer is moved automatically along the pattern to detect pattern data representing coordinates of the tracer on the pattern;

(d) storing the pattern data thus detected in the memory means; and (e) controlling the movement of the tracer under the point data and pattern data read out of the memory.

The present invention also relates to an apparatus for controlling an operation of a copying apparatus and has for its object to provide a novel and improved controlling apparatus by means of which the copying apparatus can be precisely controlled by using ordinary template.

According to the invention, an apparatus for controlling an operation of a copying apparatus which includes a tracer for tracing a contour of a pattern to be copied and a working machine movable in conjunction with the tracer in a given relationship for effecting a given working operation for an object to be worked comprises:

means for detecting coordinates of the tracer at operational points such as a piercing point, a copy start point and a copy end point and at copying points on a pattern to be copied;

first means for storing the detected coordinates at the operational points;

means for reading the stored coordinates out of the first storing means;

second means for storing the detected coordinates at the operational points and the copying points during a copying and working operation;

means for controlling a recording operation and a reading operation of the second storing means;

means for setting a position of the tracer by means of the coordinates read out of the first and the second storing means;

means for switching the copying apparatus among a copying mode, a recording mode and a reproducing mode; and means for controlling the above means in such a manner that, in the copying mode a normal copying and working operation is performed, in the recording mode the normal copying and working operation and a recording operation for the second storing means are simultaneously performed at first operation and after the first operation the working operation is performed in accordance with the stored data recorded at the first operation, and in the reproducing mode the working operation is always performed in accordance with the readout data from the second storing means.

DESCRIPTION OF THE PREFERRED EMBODIMENTS

Figure 1:
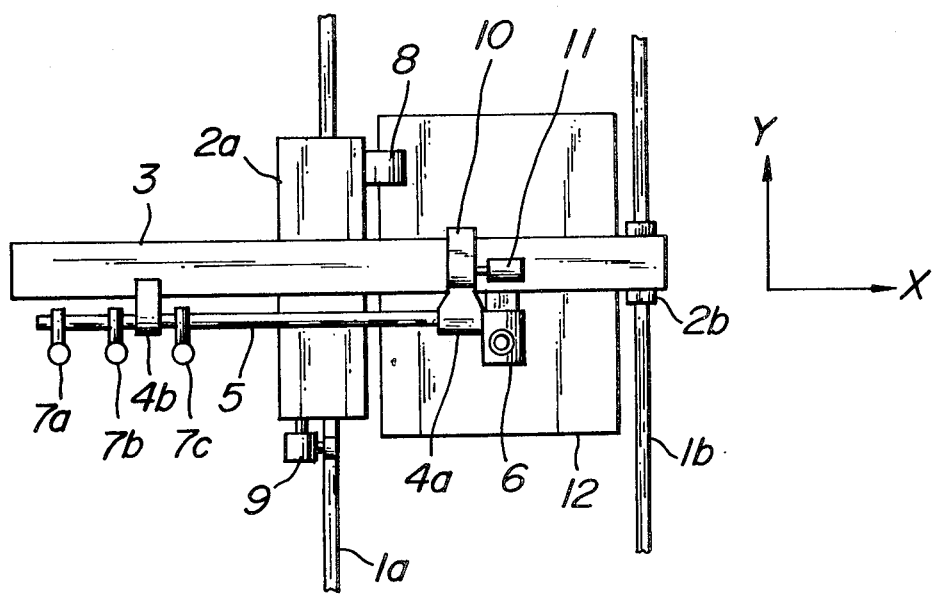
FIG. 1 is a plan view showing an embodiment of a gas cutting copying machine to which the control method according to the invention is applied.

FIG. 1 is a plan view showing an embodiment of a copy gas-cutting apparatus an operation of which is to be controlled by the method according to the invention. The entire apparatus rides on a pair of rails 1a and 1b. A direction along which the rails extend is denoted as the Y-direction and a direction perpendicular to the Y-direction as the X-direction. The apparatus comprises a main frame 2a and a subframe 2b on bottom thereof are provided rollers (not shown) which are placed on the rails 1a and 1b. The main and subframes 2a and 2b are interconnected to each other by means of a cantilever 3 which extends in the X-direction. A main carriage 4a and a subcarriage 4b are slidably arranged on the cantilever 3 and are interconnected to each other by means of a coupling lever 5. At a right hand end of the lever 5 a photoelectric tracer 6 is secured and at a left hand portion of the lever a gas torch assembly is provided which includes a plurality of gas torches 7a, 7b and 7c. It should be noted that an optical axis of the tracer 6 and an axis of each torch are aligned in the X-direction.

On the main frame 2a a Y-motor 8 is secured for driving the main frame 2a and thus the tracer 6 and the torches 7a to 7c in the Y-direction. A Y position detector 9 is also secured on the main frame 2a for detecting a position of the tracer 6 in the Y-direction. Similarly on the main carriage 4a an X-motor 10 is secured for driving the carriages 4a and 4b and thus the tracer 6 and the torches 7a to 7c in the X-direction. Similarly an X position detector 11 is secured to the main carriage 4a for detecting a position of the tracer 6 in the X-direction. In the present embodiment each of the Y and X position detectors 9 and 11 is formed by a rotary encoder. It should be noted that any other type of position detector may be used.

The tracer 6 comprises a photoelectric sensor for detecting a direction to be traced and a projector for projecting a light spot onto a template placed on a template table 12 for indicating a position which is currently being traced. In this manner the operator can know a position being traced by means of the light spot with respect to the pattern in the template.

Figure 2:
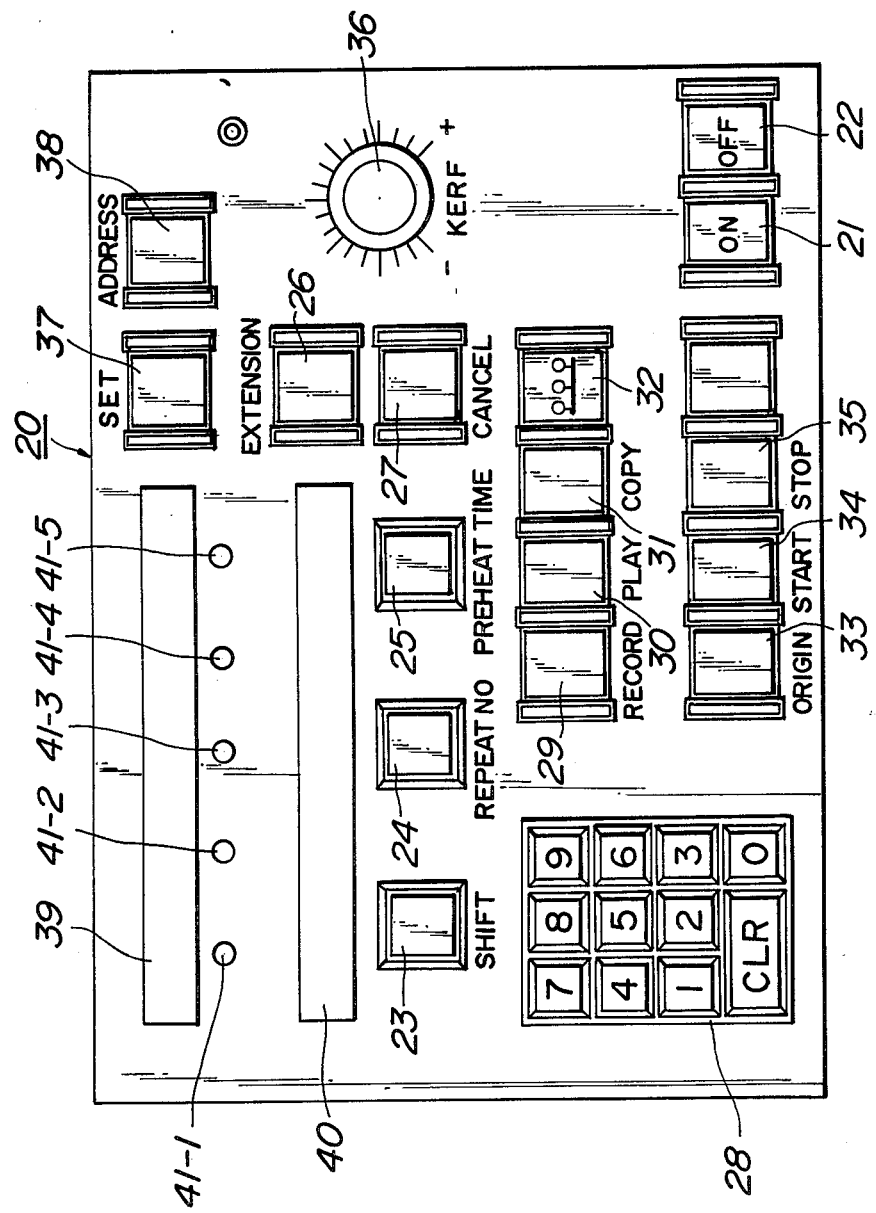
FIG. 2 is a plan view illustrating an embodiment of a control panel of the control apparatus according to the invention.

FIG. 2 is a plan view showing an embodiment of a control panel of the gas-cutting apparatus shown in FIG. 1. The control panel 20 may be provided at a suitable position on the main frame 2a or may be arranged at a position remote from the copying apparatus. In this embodiment, the control panel 20 comprises power on and off switches 21 and 22, a shift amount setting switch 23, a repeat number setting switch 24, a preheat time setting switch 25, a preheat time extension switch 26, a preheat time cancel switch 27, a tenkey 28, a recording mode selection switch 29, a reproducing mode selection switch 30, a copying mode selection switch 31, a continuous cutting selection switch 32, an origin setting switch 33, a start switch 34, a stop switch 35, a kerf offset adjusting dial 36, a set switch 37, an address switch 38, display devices 39, 40 and indication lamps 41-1 to 41-5. Functions of these switches will be described later.

Figure 3:
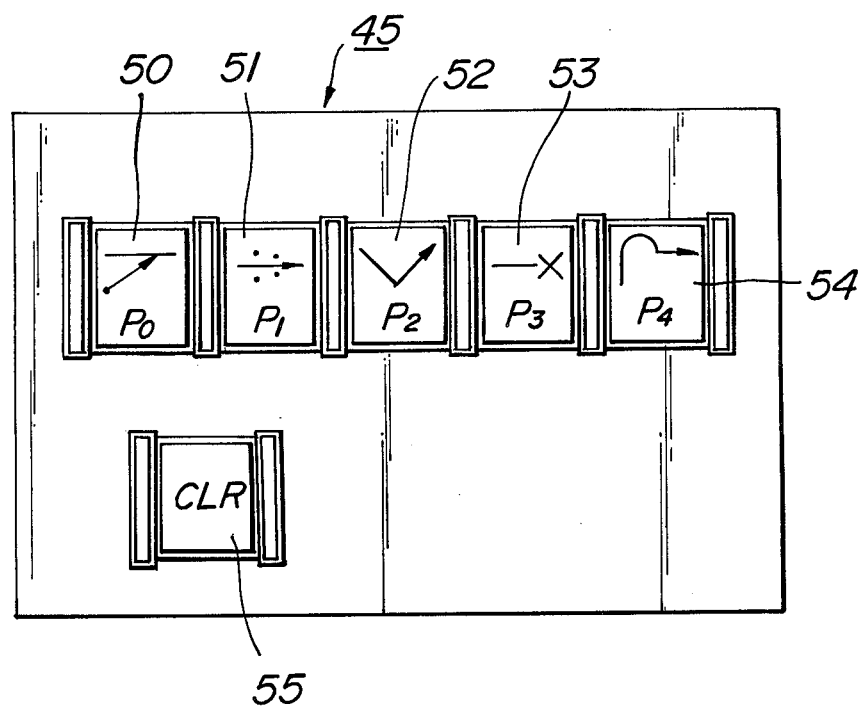
FIG. 3 is a plan view depicting an embodiment of a point setting panel of the control apparatus according to the invention.

FIG. 3 is a plan view showing an embodiment of a point setting panel for use in the gas-cutting apparatus shown in FIG. 1. The point setting panel 45 may be also provided at a suitable position on the main frame 2a or may be arranged at a position remote from the copying apparatus. In this embodiment, the point setting panel 45 comprises a piercing point presetting switch 50, a copy start point presetting switch 51, a detour point presetting switch 52, a copy end point presetting switch 53, a slow down switch 54 and a clear switch 55. Functions of these switches will be also described later.

Figure 4:
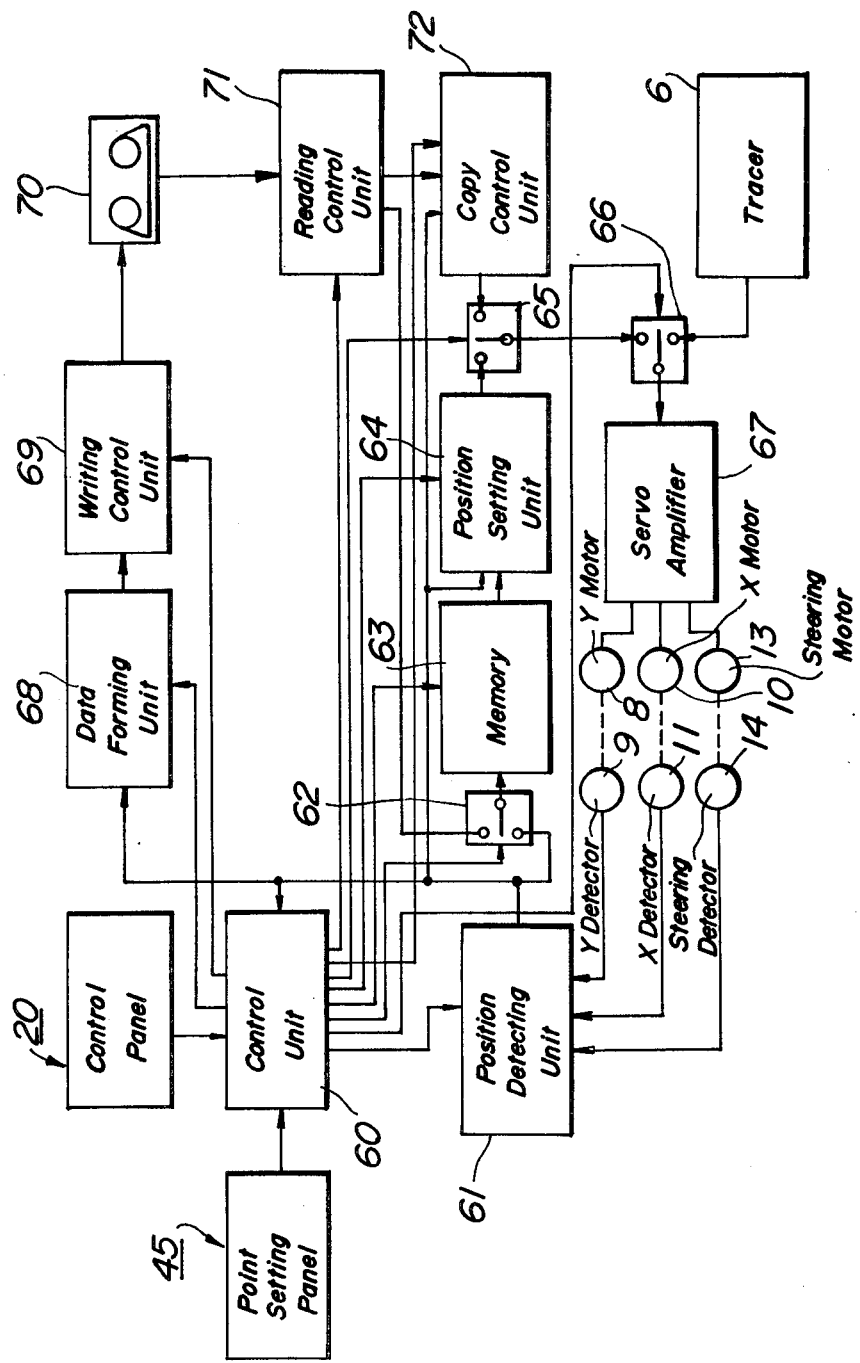
FIG. 4 is a block diagram showing an embodiment of an electric circuitry for controlling the operation of the copying machine according the method of the present invention.

FIG. 4 is a block diagram illustrating an embodiment of an electric circuitry for controlling the operation of the copying appartus according to the invention. In FIG. 4 the above mentioned Y-motor 8, Y position detector 9, X-motor 10 and X position detector 11 are shown. The control circuitry further comprises a steering motor 13 for driving a sensor head provided in the tracer 6 and a steering angle detector 14 for detecting a steering direction. The outputs from the control panel 20 and the point setting panel 45 are connected to a control unit 60 and outputs from the detectors 9, 11, and 14 are connected to a position detecting unit 61 which produces X and Y coordinates of the tracer 6 and angle information of the tracing direction. Under the control of the control unit 60, positional information at respective position is stored in given storing position of a memory 63 through a switcher 62. The thus stored positional information and a current position data read out from the position detecting unit 61 are supplied to a position setting unit 64 to control the motors 8, 10, 13 through switchers 65, 66 and a servo amplifier 67. In this manner, the tracer 6 can be moved along a predetermined path. Further, the positional information of each operational points derived from the point setting panel 45 is supplied to a data forming unit 68 to produce point data of each operational points under the control of the control unit 60. To the data forming unit 68 successive positional information of the tracer 6 which is obtained while the tracer follows the pattern on the template is also supplied as pattern data. Then, these point data and pattern data are stored in memory formed by a cassette type magnetic tape 70 through a writing control unit 69. The thus stored data in the cassette tape 70 is read out by a reading control unit 71 under the control of the control unit 60. The readout point data is stored in the memory 63 through the switcher 62, and the readout pattern data is supplied to a copy control unit 72. To the copy control unit 72, the current position data derived from the position detecting unit 61 is also supplied to control the motors 8, 10, 13 in response to the pattern information stored in the cassette tape 70 under the control of the control unit 60 via the switchers 65, 66 and the servo amplifier 67.

In the control apparatus mentioned above, use is made of three operation modes such as a copying mode for performing the gas-cutting operation without using the cassette tape 70 by storing in the memory 63 directly the positional information of each operational points derived from the template, a recording mode for recording a shape of the template in the cassette tape 70 while performing the same operation as the copying mode by using the cassette tape 70, and a reproducing mode for performing the gas-cutting operation by reading out all the necessary data from the cassette tape 70 in which the shape of the template is also recorded. In the copying mode, it is possible to perform the cutting operation only once by using the template. In the recording mode, when the repeating number of cutting operation is one, the shape of the template is recorded in the cassette tape 70 while the cutting operation is performed once, and when a plurality of cutting operations is necessary this recording mode is changed automatically into the reproducing mode after the first cutting operation by using repeatedly the data in the cassette tape 70 stored therein during the first cutting operation by times corresponding to the remaining cutting number. In the reproducing mode by using the cassette tape 70 in which the shape of the pattern has been previously recorded, it is possible to perform the cutting operation by reading out repeatedly the data stored in the cassette tape 70 corresponding to the remaining cutting number. These copying mode, recording mode and reproducing mode can be selected by pressing one of the copying mode selection switch 31, the recording mode selection switch 29 and the reproducing mode selection switch 30 respectively arranged on the control panel 20.

Figure 5:
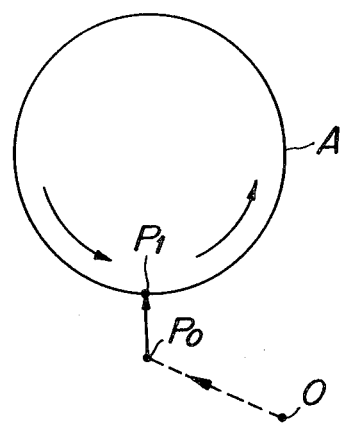
FIGS. 5 to 7 are plan views illustrating patterns to be traced by a tracer for explaining the operation of the control method according to the invention.

The successive operations and functions of the copying apparatus in case of performing the cutting operation repeatedly in the recording mode will be explained with reference to the copying pattern shown in FIG. 5.

At first, the cassette tape 70 is loaded and the recording mode is selected by pressing the recording mode selection switch 29 arranged on the control panel 20. Then, in order to determine an origin O representing a standard position for X- and Y-coordinates of each operational points, the tracer 6 is moved manually to a arbitrary position to be determined as the origin i.e. a corner of a steel plate to be worked. At such a position, up-down counters for X- and Y-directions provided in the position detecting unit 61 are reset to zero count by pressing the origin setting switch 33. In this manner, after cassette setting, recording mode selecting and origin O setting operations are finished, but prior to the actual working operation, the tracer 6 is manually moved with respect to the pattern A to be traced and coordinates of operational points such as piercing point, copy start point and copy end point are previously stored in the memory 63.

The tracer 6 is manually moved to a piercing point $P_0$ and X and Y coordinates thereof are detected by the position detecting unit 61. At this time, the piercing point presetting switch 50 is pressed to store the X and Y coordinates of the piercing point $P_0$ detected by the position detecting unit 61 into a predetermined address position of the memory 63 and also to supply these coordinates to the data forming unit 68. In this manner, the piercing point $P_0$ can be set at any desired position by taking account of the shape and property of the object to be worked.

Next, the tracer 6 is moved to a copy start point $P_1$ on the pattern A. Then, the copy start point presetting switch 51 on the point setting panel 45 is depressed so that the X and Y coordinates of the point $P_1$ are stored in the memory 63 and are transferred to the data forming unit 68. At the same time, a tracing direction is denoted by manually operating a steering handle provided on the tracer 6 to direct the tracer in a given direction. At this time, the output from the angle detector 14 is readout by the position detecting unit 61, and the angle information is stored in the memory 63 and is transferred to the data forming unit 68. In this embodiment, the pattern A is to be traced in the clockwise direction shown by an arrow in FIG. 5.

In this manner, the X and Y coordinates of each operational points and the copying direction at the copy start point $P_1$ are stored successively in the memory 63 and are supplied to the data forming unit 68. In this embodiment, since the pattern A is closed and therefore traced roundly, it is not necessary to set especially the copy end point and thus the end of the copying operation is determined by detecting an instance when the tracer 6 returns to the copy start point $P_1$. The clear switch 55 provided on the point setting panel 45 functions to reset the data of each operational points.

Next, repeating number of the operations, shift amount in the Y-direction to the next stage and preheating time for the object at the piercing point $P_0$ by means of cutting gas torches 7a to 7c are set. The repeating number of the operations can be preset by inputting the desired repeating number from the tenkey 28 after depressing the repeat number setting switch 24 and after that by depressing again the repeat number setting switch 24. In this embodiment, the repeating number can be set up to ninety-nine times and the thus inputted repeating number can be indicated on the display device 40. In the same manner, the shift amount and the preheating time can be preset by inputting the desired amount from the tenkey 28 after depressing the shift amount setting switch 23 and the preheat time setting switch 25 and after that by depressing again the switches 23 and 25. In these cases, the shift amount can be set in the range from 0 to 999 mm and the preheating time can be set in the range from 1 to 999 sec. Further, these presetting values can be also indicated on the indicator 40.

After the preparatory operation has been finished as described above, an actual operation may be started.

At first, when the tracer 6 is set at the origin O and the start switch 34 is depressed, the data of each operational points previously supplied to the data forming unit 68 is recorded successively on the cassette tape 70 through the writing control unit 69. At the same time, the coordinate position of the piercing point $P_0$ previously stored in the memory 63 is readout into the position setting unit 64 to move automatically the tracer 6 toward the piercing point $P_0$ at a high speed for example 3,000 mm/min. In this case, the position of the tracer 6 is always detected by the position detecting unit 61. When the tracer 6 reaches the piercing point $P_0$, the copying apparatus is once stopped and the gas torches 7a to 7c are actuated to preheat the object to be worked. Then, just before the end of the given preheating time, a jet of cutting oxygen flow is produced to pierce the object to be worked. The preheating time can be extended by depressing the preheat time extension switch 26 or may be reduced by depressing the preheat time cancel switch 27. In this manner, the previously set preheating time can be changed by operating the extension switch 26 and the cancel switch 27. Therefore, a suitable preheating time can be obtained corresponding to the shape of the steel plate and the strength of the preheating frame.

When the lapse of the preheating time is detected by the control unit 60, the coordinate of the copy start point $P_1$ is readout from the memory 63 to the position setting unit 64 to move automatically the tracer 6 to the copy start point $P_1$ while the gas-cutting operation is performed at the predetermined cutting speed of (50–1,250 mm/min.). During this cutting operation, a steering angle information relating to the copy start point $P_1$ is readout to direct the tracer in a given direction by energizing the motor 13.

After it is detected that the tracer 6 has reached the copy start point $P_1$, the tracer 6 follows the contour of the pattern A to cut the object into a shape corresponding to that of the pattern A. At the same time, the pattern data is recorded on the cassette tape 70. This pattern data is recognized as an assembly of line segments each having 0.5 mm line length from the position data successively supplied to the data forming unit 68, and a set of line segments is recorded on the cassette tape 70 as a block including for example 250 segments.

In this manner, the tracer 6 traces the pattern A in the clockwise direction and returns to the copy start point $P_1$. When this is detected, the ejection of the cutting oxygen is stopped. It should be noted that the tracer 6 could not return to the point $P_1$ in an extremely accurate manner, but might deviate therefrom to a slight extent. Even in such a case the completion of copying operation for the pattern A has to be detected. For this purpose an error window with a center at the point $P_1$ and having a suitable size has been predetermined by taking account of a width of a cut line, accuracy of various portions, etc. In practice the error window may be a square having a side length of 0.5 to 1.5 mm. When the optical axis of the tracer 6 enters such an error window, it can be judged that the tracer 6 returns to the start point $P_1$.

In this manner, the first cutting operation can be performed while copying the template pattern and at the same time the coordinates of this pattern are recorded on the cassette tape 70. In this case, it is possible to correct the size of the product to be worked by controlling the kerf offset dial 36 provided on the control panel 20 and the pattern data including this corrected width can be recorded on the cassette tape 70. In this embodiment, when the adjusting dial 36 is rotated in anti-clockwise or clockwise direction, the cutting width is corrected by maximum 5 mm right or left respectively with respect to the copying direction.

When the first cutting operation is finished, the reproducing mode is automatically selected and the cutting operation for the next stage is started after the tracer 6 is moved at a predetermined shift amount. In the second cutting operation, it is not necessary to copy the template again but to move the tracer 6 to the next stage. In this case, the cutting operation is performed correspondingly to the information recorded on the cassette tape 70. That is to say, in the reproducing mode, the data recorded on the cassette tape 70 is read out by the reading control unit 71 and the readout point data is stored in the memory 63 through the switcher 62. The moving control between successive points is performed in response to this stored point data under the control of the position setting unit 64. At the same time, the pattern data is supplied to the copy control unit 72 to move the motors 8, 10, 13 corresponding to the pattern data recorded on the cassette tape 70 through the switches 65, 66 and the servo amplifier 67. Moreover, also in this reproducing mode, it is possible to correct the cutting width by about 1 mm right or left with respect to the copying direction by adjusting the kerf offset adjusting dial 36.

As mentioned above, during the repeating operation in the recording mode, the tracer 6 follows automatically the contour of the pattern provided in the template only at the first cutting operation, and after the first cutting operation the cutting operation is performed in response to the data recorded on the cassette tape 70 during the first cutting operation. Therefore, the operation efficiency is extremely improved and since use is made of the usual templates as they are, the copying operation is performed in an inexpensive manner. Further, the operational points such as the piercing point, the copy start point, etc. can be preset arbitrarily at a job site, so that the special skill of experienced operators can be adopted or utilized in the actual operation and the more efficient and accurate copying operation can be achieved.

Figure 6:
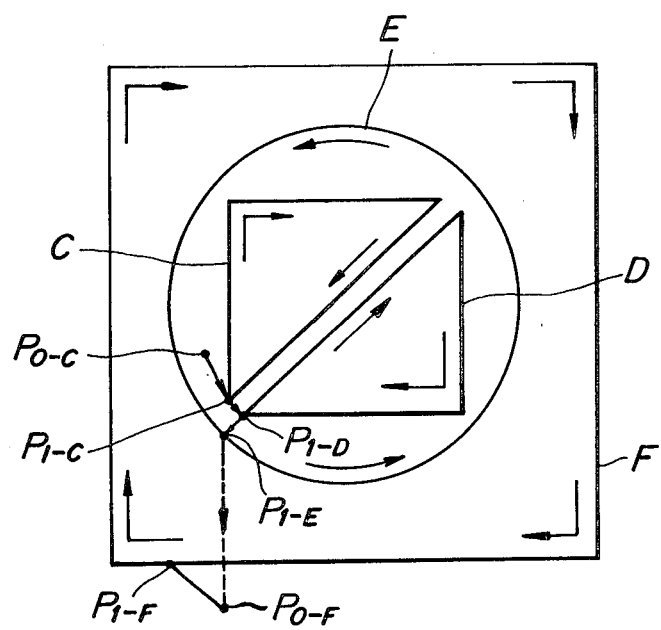

FIG. 6 shows another example of path to be traced by the tracer 6 in case of effecting the recording mode for a plurality of patterns C to F. Two patterns C and D are triangles, a pattern E a circle and a pattern F is a square. In this case three workpieces, i.e., two triangular pieces and one rectangular piece with a circular opening are to be formed. Therefore the cutting operation is effected from a point $P_{0-C}$ situated inside the circular pattern E, but outside the triangular patterns C and D. At first the tracer 6 is moved into the first piercing point $P_{0-C}$ and its X and Y coordinates are stored in the memory 63 by actuating the piercing point presetting switch 50. Then coordinates of a copy start point $P_{1-C}$ for the pattern C, a copy start point $P_{1-D}$ for the pattern D and a copy start point $P_{1-E}$ for the pattern E are successively stored in the memory 63, while moving the tracer manually through these points. Next coordinates of a second piercing point $P_{0-F}$ and a copy start point $P_{1-F}$ for the pattern F are stored in succession. Moreover, the information of each operational points is supplied to the data forming unit 68.

In the actual working the tracer 6 is moved from the origin to the first piercing point $P_{0-C}$ at the high speed to effect the piercing. After that the tracer 6 is moved toward the copy start point $P_{1-C}$ at the cutting speed. After the tracer 6 is detected to reach the point $P_{1-C}$, the tracer 6 moves along the pattern C in the clockwise direction and arrives again at the start point $P_{1-C}$. When it is detected that the tracer 6 reaches the copy start point $P_{1-C}$, the coordinates of the point $P_{1-D}$ towards which the tracer 6 should be moved are readout from the memory 63 into the position setting unit 64 in which this point $P_{1-D}$ is determined as a copy start position. In this case the tracer 6 is moved into the start point $P_{1-D}$ without stopping the cutting oxygen flow.

When the tracer 6 arrives at the position $P_{1-D}$, the copying mode is again selected and the copying and working is carried out along the contour of the pattern D. After full tracing along the closed pattern D the tracer 6 again reaches the point $P_{1-D}$, and then the tracer 6 is moved towards the next copy start point $P_{1-E}$ at the cutting speed. When the tracer 6 arrives at the point $P_{1-E}$, the copying mode is again selected and the copying and working is effected in accordance with the pattern E. When the tracer returns to the point $P_{1-E}$, the coordinates of the point $P_{0-F}$ towards which the tracer 6 should be moved are readout from the memory unit 63 into the position setting unit 64 which detects that this point $P_{0-F}$ has been stored as the piercing point. Therefore the ejection of the cutting oxygen flow is temporarily stopped and the tracer 6 is moved to the piercing point $P_{0-F}$ at the high speed. After the tracer 6 reaches the point $P_{0-F}$, the piercing is started to form a hole in the object at the piercing point $P_{0-F}$. After the preheating has been finished the tracer 6 is moved at the cutting speed to the copying start point $P_{1-F}$ for the pattern F. When the tracer 6 arrives at the point $P_{1-F}$, the copying mode is again selected and the copying and working operation along the pattern F is performed.

During first copying and working mentioned above, the point data of each operational points and the pattern data of each patterns C to F are recorded on the cassette tape 70. Therefore, in the cutting operation after the first one, the reproducing mode is selected and the cutting operation is carried out under the control of to the data read out of the cassette tape 70 in the above mentioned manner without copying the template.

As explained above according to the invention the working machine can be moved from a pattern to a pattern with or without effecting the continuous cutting operation at the low or high speed. The copying apparatus can be automatically controlled in the above mentioned manner by detecting to what kind of functional point does a point to which the tracer should be moved belong. Therefore during the preparation period it is not necessary at all to store a control command about the cutting oxygen flow, the tracer traveling speed, etc. Of course it is also not required for the operator to set these instruction during the actual working.

Next, each function of the detour point presetting switch 52, the copy end point presetting switch 53, and the slow down switch 54, respectively shown in FIG. 3 and the continuous cutting selection switch 32, the stop switch 35, the set switch 37, the address switch 38, the display device 39, and the indication lamps 41-1 to 41-5 will be explained.

Figure 7:
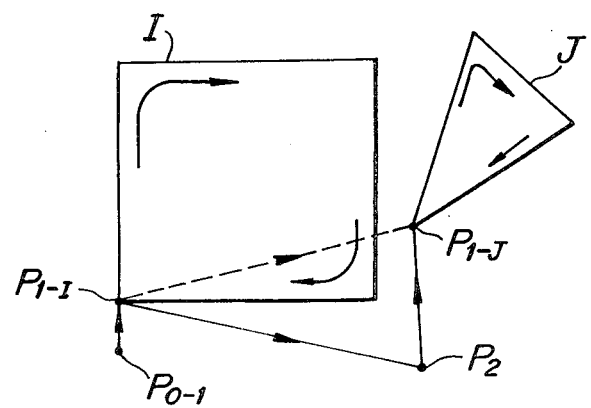

The detour point presetting switch 52 is used to preset a path to be traced by the tracer 6 when the tracer is moved from a pattern to a next pattern without interrupting the ejection of cutting oxygen flow. This will be explained in detail with reference to a case in which the copy-cutting should be effected continuously for two patterns I and J shown in FIG. 7. A piercing point and a copy start point for the pattern I are denoted by $P_{0-I}$ and $P_{1-I}$, respectively and a copy start point for the pattern J is indicated by $P_{1-J}$. If the tracer 6 is moved from the point $P_{1-I}$ to the copy start point $P_{1-J}$ of the second pattern J along a path the cutting oxygen flow after the copy-working for the first pattern I has been finished, the torch would travel over a workpiece which has been cut in the copy-working for the first pattern I and might injure the workpiece. Therefore the tracer could not be moved along the broken line. In such a case a detour point $P_2$ may be preset to store its coordinates in the memory 63 by actuating the detour point presetting switch 52. It should be noted that the detour point $P_2$ is selected so that the tracer can bypass the pattern I. After the copy-working for the first pattern I has been completed the tracer 6 can be moved from the point $P_{1-I}$ to the point $P_{1-J}$ via the point $P_2$ without interrupting the ejection of cutting oxygen and the workpiece which has been formed by the copy-working for the first pattern I can be protected against the cutting oxygen flow. In this case since the detour point $P_2$ is not a piercing point for the second pattern J this point $P_2$ should be discriminated from the piercing point. To this end the detour point presetting switch 52 is provided separately from the piercing point presetting switch 50. In this manner the traveling of the tracer can be automatically controlled merely by presetting the coordinates of functional points in such a manner that the tracer is moved from a point to a next one with interrupting temporarily the cutting oxygen flow when the next point has been set as the piercing point, while the tracer is moved at the cutting speed without interrupting the gas flow when the next point has been stored as the detour point.

The copy end point presetting switch 53 is used to preset and store coordinates of a copy end point. If a pattern to be traced could not be described with one stroke, the copying operation has to be interrupted at one or more given positions and then the copying operation is started gain from one or more separate positions. In the preparation step if coordinates of a given point are stored as the copy end point by actuating the copy end point presetting switch 53, in the actual working when the tracer reaches this point, the copying operation is interrupted. If a piercing point has been preset between the copy end point $P_3$ and a next copy start point $P_1$, the ejection of cutting oxygen is automatically interrupted at the copy end point $P_3$ and then the tracer 6 is moved to the next point at the high speed. It should be noted that this next point is not always the piercing point. On the contrary if the next copy start point $P_1$ has not been stored as the piercing point $P_0$, the tracer is moved to this point at the cutting speed without interrupting the oxygen flow.

If a pattern has a sharp corner or use is made of a high speed plasma cutting, it is sometimes required to slow down the cutting speed just before the corner. To this end the slow down switch 54 is provided. In the preparation step the tracer 6 is positioned at a point from which the cutting speed should be decreased and then the slow down point presetting switch 54 is actuated to store the coordinates of this point as a slow down start point $P_4$. In the actual working when the tracer is detected to arrive at a point just before the slow down start point $P_4$ by a predetermined amount of e.g. 10 mm, the cutting speed is decelerated at a predetermined rate from this point. When the tracer 6 is detected to pass the slow down start point $P_4$ at the predetermined decelerating rate by a given amount of e.g. 5 mm, the cutting speed is accelerated again at a predetermined rate to the ordinary cutting speed. In this manner the cutting speed can be automatically decreased at the sharp corner to increase the working accuracy. In the above embodiment only the coordinates of the corner to be decelerated is preset, but only the accelerating point just before the corner or the decelerating point just after the corner may be preset.

In the repetitive working operation which has been explained with reference to FIG. 5, the ejection of the cutting oxygen is interrupted during the traveling of the tracer 6 in the Y-direction to next stage. However depending upon a pattern to be traced it is preferable not to interrupt the cutting gas flow. For this purpose the control panel 20 has the continuous cutting selection switch 32. As long as the switch 32 is depressed, the cutting oxygen flow is not interrupted even after the working operation has been finished and the tracer is moved to the next position at the cutting speed.

The stop switch 35 functions to stop temporarily the cutting operation when any interruption such as a plugging of a port of the torch nozzle is occurred during the cutting operation. If the stop switch 35 is depressed, the cutting oxygen flow is stopped to interrupt the cutting operation. The interrupted cutting operation is started again by depressing the start switch 34.

The set switch 37 functions to set various parameters. The preset parameters as indicated on the dispaly device 39 by actuating the address switch 38. At the same time, one of the indication lamps 41-1 to 41-5 is turned on corresponding to the indicated parameter.

The present invention is not limited to the embodiments expalined above, but various modification and alternation are possible. For example, in the embodiment mentioned above, the point data of each operational points and the pattern data are recorded on the cassette tape, but use may be made of the other recording medium such as a random access memory, a floppy disc, a magnetic bubble domain memory, etc. Moreover, in the reproducing mode, it is possible to change only the point data such as the piercing point $P_0$ and the copy start point $P_1$ without changing the pattern data and also to change the figure of the pattern by effecting a coordinate transformation in case of reading out the data from the cassette tape. Further, in the embodiment mentioned above, the data of each operational points is stored in the memory 63 and the tracer is moved between respective points corresponding to the memorized data under the control of the position setting unit 64, it is also possible to eliminate the memory 63 and the position setting unit 64 by moving the tracer between respective points corresponding to the data recorded on the cassette tape under the control of the copy control unit 72. Furthermore, it is possible to arrange separately the recorder for recording the data on the cassette tape and the player for reproducing the data recorded on the cassette tape. Moreover, in the embodiment mentioned above, the present invention is described as being applied to the control for the copy-cutting machine, but may be also applied to other copying apparatus such as a copy-welding machine, and a copy-milling machine. In the above embodiments the position setting unit 64 discriminates the kinds of the stored points to produce the signals for controlling the interruption of the cutting oxygen flow, the traveling speed, etc., but the present invention should not be limited to such embodiments. According to the principal concept of the invention it is sufficient to control the tracer in such a manner that it automatically travels along the predetermined path. In the above copying apparatus the tracer and the gas torch, i.e., the working machine are related to each other in the relationship of one-to-one, but may be related differently therefrom.

The advantages according to the present invention may be summarized as follows:

(1) Since it is possible to preserve effectively the record medium such as the cassette tape on which the data of each operational points and the pattern data are recorded and to use the record medium by reproducing such data in case of performing the repetitive working operation for the same pattern, the required working operation can be performed in a simple and rapid manner.

(2) Since any guide line for guiding the tracer from the piercing point to the copy start point is not required the ordinary templates can be used as they are and thus the copy-working can be carried out in an economical manner.

(3) After the operation points have been stored it is sufficient for the operator to actuate the start switch and the operator is not necessary to watch the operation of copying machine during the working step. Therefore the operation becomes quite simple and the working efficiency becomes very high.

(4) As compared with the numerical control system the control method according to the invention is rather simple and can be carried out into effect in an inexpensive manner.

(5) The operational points such as the piercing point, the copy start point, etc. may be simply preset in the actual working place and during this presetting operation the skill of experienced person can be adopted to a great extent.

(6) By discriminating the kinds of operational points it is possible to provide the functions for supplying the command signals with respect to the traveling speed, the operation of the working machine, etc. as well as the command signals for the traveling of tracer. In this manner the operation efficiency can be further enhanced.

What is claimed is:

1. A method of controlling the operation of a copying apparatus which includes a tracer for tracing automatically a contour of a pattern to be copied and a working machine having a working head movable in conjunction with the tracer in a given relationship for effecting a given working operation for an object to be worked comprises the steps of:

(a) prior to an actual working operation, moving the tracer manually with respect to the pattern to be traced to detect point data representing coordinates of the tracer at respective operational points which include at least a working start point, a copy start point, and a copy end point;

(b) storing the point data thus detected in memory means;

(c) moving automatically the tracer by reading the stored point data from the memory means until the tracer reaches the copy start point, and when the tracer has reached the copy start point, the tracer is moved automatically along the pattern to detect pattern data representing coordinates of the tracer on the pattern;

(d) storing the pattern data thus detected in the memory means; and (e) controlling the movement of the tracer under the point data and pattern data read out of the memory.

2. A method according to claim 1, wherein the object is worked, while the tracer is moved under the control of the point data read out of the memory means and follows the pattern.

3. A method according to claim 1, wherein an origin of the coordinates is shifted with respect to the object during the actual working operation, so that the same working operation is repeatedly effected in separate regions of the object.

4. A method according to claim 3, wherein, during a repetitive operation, the working operation is automatically performed in accordance with the point and pattern data read out of the memory means.

5. A method according to claim 1, wherein the pattern is that which can be described with one stroke and the copy start point is also used as the copy end point.

6. A method according to claim 5, wherein the return of the tracer to the copy start point is detected in such a manner that the tracer enters into an error window having a center at the copy start point and a predetermined size.

7. A method according to claim 1, wherein a command signal for denoting a direction of the copying movement is previously stored in the memory means in relation to the coordinates of the copy start point prior to the actual working operation and the command signal thus stored is read out during the actual working operation to control the direction of copying movement of tracer at the copy start point.

8. A method according to claim 1, wherein the pattern to be traced is shifted with respect to the copying apparatus by a given distance and the working operation for the object in accordance with the pattern is repeated at respective shifted positions.

9. A method according to claim 8, wherein said given distance is preset prior to the actual working operation.

10. A method according to claim 9, wherein the coordinates of the operational points stored in the memory means are automatically shifted by the preset distance.

11. A method according to claim 10, wherein said shift of the coordinates is effected by a coordinate transformation.

12. A method according to claim 1, wherein prior to the working operation command signals for denoting an operation of the working machine at the operational points and during the movement between the successive operational points are stored in the memory means in relation to the coordinates at the operational points; and during the actual working operation the command signals are read out from the memory means together with the coordinates of the related points to control automatically the operation of the working machine.

13. A method according to claim 12, wherein during the actual working operation the movement of the tracer and the operation of working machine are controlled in accordance with the read out coordinates and command signals.

14. An apparatus for controlling an operation of a copying apparatus which includes a tracer for tracing a contour of a pattern to be copied and a working machine in conjunction with the tracer in a given relationship for effecting a given working operation for an object to be worked comprising:

means for detecting coordinates of the tracer at operational points such as a piercing point, a copy start point and a copy end point and at copying points on a pattern to be copied;

first means for storing the detected coordinates at the operational points;

means for reading the stored coordinates out of the first storing means;

second means for storing the detected coordinates at the operational points and the copying points during a copying and working operation;

means for controlling a recording operation and a reading operation of the second storing means;

means for setting a position of the tracer by means of the coordinates read out of the first and the second storing means;

means for switching the copying apparatus among a copying mode, a recording mode and a reproducing mode; and means for controlling the above means in such a manner that, in the copying mode a normal copying and working operation is performed, in the recording mode the normal copying and working operation and a recording operation for the second storing means are simultaneously performed at first operation and after first operation the working operation is performed in accordance with the stored data recorded at the first operation, and in the reproducing mode the working operation is always performed in accordance with the readout data from the second storing means.

15. An apparatus according to claim 14, wherein said second storing means is formed by a record medium which is detachably mounted on the copying apparatus.

16. An apparatus according to claim 15, wherein said second storing means is formed by a cassette type magnetic tape.

17. An apparatus according to claim 14, further comprising means for detecting a steering direction of the tracer and the detected steering direction is stored in the second storing means in relation to the coordinates at the copy start point.

18. An apparatus according to claim 14, wherein said means for detecting the coordinates of tracer at the operational points comprise a control panel including a working start point presetting member and a copy start point presetting member.

19. An apparatus according to claim 18, wherein said working machine is a gas cutting machine and said working start point presetting member is a piercing point presetting member.

20. An apparatus according to claim 19, wherein said control panel further comprises a preheat timer for presetting a preheating time for piercing the object.

21. An apparatus according to claim 20, wherein said control panel further comprises a preheating time prolonging member and a preheat cancel member.

22. An apparatus according to claim 21, wherein said control panel further comprises a member for presetting a shift distance for the next object to be cut in case of a repetitive working and a member for presetting the number of repetitions.

23. An apparatus according to claim 19, wherein said control panel further comprises a member for presetting a copy end point presetting means.

24. An apparatus according to claim 19, wherein said control panel further comprises a member for presetting a detour point.

25. An apparatus according to claim 19, wherein said control panel further comprises a member for presetting a slow down point from which the moving speed of tracer should be decelerated.

* * * * *